United States Patent Office 3,476,730
Patented Nov. 4, 1969

3,476,730
PROCESS FOR LOW-PRESSURE POLYMERIZATION
OF α-OLEFINES
Roland Streck and Wolfgang Seeliger, Marl, Germany,
assignors to Chemische Werke Huls Aktiengesellschaft,
Marl, Germany, a corporation of Germany
No Drawing. Filed May 1, 1967, Ser. No. 634,821
Claims priority, application Germany, July 22, 1966,
C 39,678
Int. Cl. C08f 1/56
U.S. Cl. 260—93.1                                  2 Claims

ABSTRACT OF THE DISCLOSURE

Process for the polymerization and co-polymerization of olefines having the formula $CH_2=CH-R$, wherein R is an aliphatic hydrocarbon radical with up to 8 carbon atoms or a cyclic or an aromatic hydrocarbon radical, employing the low-pressure method, in the presence of mixed catalysts formed of methyl- or ethylaluminum- sesqui- or dichloride on one hand and a compound of a heavy metal of the IV to VI sub-group of the periodic system on the other hand and the further presence, as activator of a cyclic imidoester of the formula

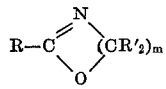

wherein each of R and R' is a hydrogen atom, an alkyl radical with up to 20 carbon atoms, a cycloalkyl radical with up to 8 carbon atoms, or an aryl radical, and $m$ equals 2 or 3.

---

The invention relates to an improvement in the process for the polymerization and copolymerization of olefines having the formula $CH_2=CH-R$ in which R represents an aliphatic hydrocarbon radical with up to 8 carbon atoms or a cyclic or aromatic hydrocarbon radical, by the low-pressure method in the presence of mixed catalysts formed of methyl- or ethylaluminumsesquichloride or -dichloride and a compound of a heavy metal of subgroups IV to VI of the periodic system and the further presence of an activator.

In this process it is desirable to obtain polymers in high yields and of high crystallinity while keeping low the outlay for the polymerization as well as for the further processing.

Catalyst mixtures of titaniumtrichloride of a specific crystal modification and method of preparation and diethylaluminumchloride and aluminumtriethyl have been found to be particularly effective in the preparation of high molecular, extensively isotactic poly-α-olefines, in particular polypropene, polybutene-(1) and poly-4-methyl-pentene-(1).

On the other hand, catalysts composed of titaniumtrichloride, irrespective of the method of preparation and ethylaluminumsesquichloride, ethylaluminumdichloride and similar halogen-rich organoaluminum compounds have only a minimum effect on propylene, butene-(1) and other higher α-olefines even though they are capable of polymerizing ethylene. If a polymerization product is formed at all it will be inferior to the products prepared in the above described manner as to its stereo regularity as well as yield. Such as detrimental influence can be observed likewise if the titaniumtrichloride is prepared by reduction of titaniumtetrachloride with organoaluminum compounds and is not freed, for example by thorough washing, from the more halogen-rich organoaluminum compounds which are by-products of the reduction.

However, the more halogen-rich compounds are less flammable and can be prepared with much greater ease. Therefore, there is a great interest in substituting the costly and spontaneously inflammable and very dangerous aluminumtrialkyl and dialkylaluminumhalides by the more halogen-rich compounds.

It is known that it is possible to bind the harmful halogen-rich organoaluminum compounds by the addition of metal fluorides (D.B.P. 1,110,418), ethers (French Patent 1,386,562), amines (French Patents 1,223,391 and 1,203,848) or other Lewis bases, for example dimethylformamide (U.S. Patent 3,147,238).

By the addition of such complex formers to the systems composed of alkylaluminumsesquihalides and dihalides and heavy metal compounds which are not or only slightly polymerization-active, such systems are made capable of polymerizing the higher α-olefines.

Among the numerous third components, heretofore proposed, are:

alkalifluorides (U.S. Patent 3,125,558; French Patent 1,233,823), alkalichlorides and iodides (British Patent 949,713; U.S. Patent 2,909,511),
quaternary ammoniumhalides (British Patents 937,557 and 907,685),
quaternary phosphoniumhalides and tertiary sulphoniumhalides (British Patents 907,685 and 954,325),
secondary amines such as dibutylamine and N-methylaniline (Hungarian Patent 150,847) and halogen hydrides thereof (Japanese Patent 14,833/63),
tertiary amines such as triethylenediamine (British Patents 935,783 and 937,558),
trimethylamine and pyridine (Belgian Patent 594,407),
acridine (Japanese Patent 19,543/65),
ethers such as diisopropylether, di-n-butylether and di-isoamyl ether (French Patent 1,371,723),
anisole (French Patent 1,371,731),
tetrahydrofuran and its methyl derivatives (British Patent 927,815, U.S. Patent 3,129,209, British Patent 932,656),
epoxides such as those of ethylene, propylene, butylene and amylene (U.S. Patent 3,129,208),
esters such as glycoldiacetate (U.S. Patent 3,178,401),
carbonic acid esters and lactones (U.S. Patent 3,230,208),
orthoesters such as ethylorthocarbonate and trimethyl-orthoacetate (U.S. Patent 3,149,098),
amides, esters and esteramides of mono- and dicarboxylic acids as well as of phosphoric and phosphorus acid, such as dimethylformamide, dimethylacetamide, tetramethyladipamide, tetraethylamidophosphate, triethylphosphate, triethylphosphite, hexamethyl phosphoric acid amide, tetramethylurea, N-benzoylmorpholine (British Patent 921,636, French Patent 1,309,443, U.S. Patents 3,213,073, 3,186,977 and 3,147,240),
alkyl phosphonic acid esters such as ethyl phosphonic acid diethylester (U.S. Patent 3,216,987),
triphenylphosphine (Belgian Patent 577,214)—arsine (U.S. Patent 2,951,066),
trialkyl and triarylarsines and stibines (U.S. Patent 3,222,337),
dimethylsulphoxide (Belgian Patent 609,145),
ammonium, alkali and alkaline earth salts of carboxylic acids such as sodium and potassium acetate (Dutch patent application 64/13,675 and French Patent 1,378,804).

Also disclosed are nitrogeneous and/or oxygen containing compounds of silicon, such as tetrakis-dimethylaminosilane, tris-dimethyl-amino-chlorosilane (French Patent 1,354,815), trimethylethoxysilane, diethyldiethoxysilane, tetraethylsilicate, hexamethyldisiloxane (French Patent 1,349,887) and of titanium, such as tetrakisdimethylaminotitanium, diisobutoxy-bis-di-methylaminotitanium (Belgian Patent 652,506) and of aluminum such as the compound $C_2H_5O\text{—}CO\text{—}C\!\!=\!\!(CH_3)\text{—}OAl(O\text{-iso-}C_3H_7)_2$, derived from the enolacetoethylacetate (Dutch patent application 65/503,672).

In these three component catalysts the titaniumtrichloride is usually employed as an α-modification, with its crystallinity greatly reduced, if desired, by grinding. However, there are also known combinations of the β-, γ- and δ-modification with alkylaluminumdihalide and triphenylphosphinesulphide, -selenide, diethylcarbonate, diisopropylthiourea, 2-ethylhexyl-phosphineoxide or tricresylphosphate (French Patent 1,377,419).

The mode of action of such additives, considered as Lewis bases or electron donors, is not yet fully known. According to Natta (Makromol. Chemie 70, 206 to 221–1964) as well as Pasquon (Makromol. Chemie 61, 116 to 131–1963) the alkylaluminumsesqui- or -dihalides, in the presence of a Lewis base in a molar ratio of 1:2, will dismutate in accordance with the equations $$Al_2R_3X_3 + Y \rightleftharpoons \tfrac{1}{2}Al_2R_4X_2 + RAlX_2 \cdot Y$$

or  (Y-Lewisbase)

$$Al_2R_2X_4 + Y \rightleftharpoons \tfrac{1}{2}Al_2R_4X_2 + AlX_3 \cdot Y$$

into dialkylaluminumhalide and complex aluminumtritrihalide or alkylaluminumdihalide. If this were true, they should have a similar effect as the dialkylalumiumhalide when used in organo-metallic mixed catalysts. Coover (J. Polym. Sci. Part C 1963, 1511 to 1528) on the other hand disputes the presence of free dialkylaluminumhalide in such three-components-catalysts and assumes a specific interaction of the third component with the active centres of the titaniumhalide.

The multitude of the compounds, proposed as third component in the various publications as well as the lack of agreement as to the mode of action demonstrates that at the present state of science it can not be predicted how a compound should be structured in order to cause a specifically high activation of the catalyst for a polymerization of α-olefines.

The invention is based on the problem to find and to disclose a particularly effective additive of this type.

The problem is solved by the invention by employing as activating agent a cyclic imidoester of the formula

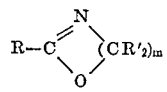

in which R and R' is a hydrogen atom, an alkyl radical with up to 20 carbon atoms, a cycloalkyl radical with up to 8 carbon atoms, and $m$ is 2 or 3.

Suitable α-olefines are propene, butene-(1), pentene-(1), hexene-(1), 3-methyl-butene-(1), 4-methylpentene-(1), 5-methylhexene-(1), styrene and vinylcyclohexane. These olefines can be used with advantageous results either individually, in mixture or in succession. In particular, the olefines can also be copolymerized with other monomers without loss of the advantageous effect of the novel activators. Of course, as the proportion of comonomers increases, products are formed which are increasingly elastomeric. Ethylene is a particularly suitable monomer for this purpose.

Suitable organoaluminum compounds are ethylaluminum-sesquichloride, ethylaluminumdichloride, methylaluminumsequichloride and methylaluminumdichloride as well as mixtures thereof.

As compounds of a heavy metal of subgroups IV to VI of the periodic system there are basically suitable any compounds known heretofore for this purpose, for example compounds of zirconium, vanadium, chromium and especially of the titanium.

The novel activators are especially effective in systems which contain titaniumtrichloride in the form of the mixed crystal $3TiCl_3 \cdot AlCl_3$, obtained by reduction of titaniumtetrachloride with metallic aluminum.

The Al/Ti-ratio in these mixed catalysts can vary within a wide range. In order to obtain polymers with molecular weights of industrial usefulness, the ratio should be kept within the limits of 6:1 to 1:1. A ratio between 4:1 to 2:1 is preferable in view of the characteristics of the polymers.

Cyclic imidoesters of the formula

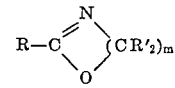

in which R and R' represent a hydrogen atom, an alkyl or alkylene radical with up to 20 carbon atoms, a cycloalkyl radical with up to 8 carbon atoms, or an aryl radical and with $m$ equals 2 or 3, and in which cross-links can exist between adjacent R's, are for example Δ²-oxazoline,
2-ethyl-Δ²-oxazoline,
2-isopropenyl-Δ²-oxazoline,
4,4-dimethyl-Δ²-oxazoline,
4,5-tetramethylene-Δ²-oxazoline,
2-phenyl-4,4-dimethyl-Δ²-oxazoline,
Δ²-dihydrooxazine,
2-phenyl-Δ²-dihydrooxazine,
2-methyl-6-ethyl-Δ²-dihydrooxazine,
2-ethyl-5,6,6-trimethyl-Δ²dihydrooxazine and
6,6-dimethyl-Δ²-dihydrooxazine.

In a particular embodiment the imidoester is a Δ²-oxazoline which is substituted by hydrocarbon radicals in 2-position, for example 2-methyl-Δ²-oxazoline, 2-ethyl-Δ²-oxazoline, 2-isopropyl-Δ²-oxazoline, 2-phenyl-Δ²-oxazoline, 2-n-heptyl-Δ²-oxazoline, 2-pentadecyl-Δ²-oxazoline and 2-vinyl-Δ²-oxazoline.

These activators are employed in molar ratios of approximately 0.25 to 1.0, relative to the organoaluminum compound. If aluminumsesquichlorides are used, ratios should range from 0.3 to 1.0, and in case of alkylaluminumdichlorides from 0.25 to 0.75. If these values are lowered, the activation effect will decrease significantly, and if the values given above are exceeded substantially, the effect will likewise decrease and might even cause the catalysts to become inactive. Preferred are ratios from 0.50 to 0.98 in case of alkylaluminumsesquichlorides and from 0.35 to 0.65 in case of alkylaluminumdichlorides.

The polymerization, aided by the novel activators, can take place within a wide temperature range, usually between −10 and +80° C., and preferably between 0 and +40° C. A control of the molecular weight by known methods, for example by varying the polymerization temperature or by addition of hydrogen to the monomers, is also feasible.

EXAMPLES 1 to 41

Polymerization of 4-methylpentene-(1)

In a 1-liter three-necked flask 16 mmol of titaniumtrichloride (Stauffer AA), 32 ml. of a 1-molar solution of the halogen-rich alkylaluminum compound, various additions of activator, also in 1-molar solution and about 500 ml. of absolute hexane are stirred together for 10 minutes at room temperature under a nitrogen atmosphere. The quantity of hexane is so chosen that the volume of the entire mixture, including the monomer, will amount always to 650 ml. After a maturing period the mixture is heated to 40° C. and 84 g.=1 mol of 4-methylpentene-(1) is added drop-by-drop over a period of 15 minutes. After 20 hours the reaction is terminated by the addition of 100 ml. of isopropanol and the contents of the flask are transferred to a 4-liter flask containing 2 liters of isopropanol. After precipitation the polymerizations product is boiled for 2 hours with 2 liters of methanol and 100 ml. of concentrated hydrochloric acid. The product is filtered, washed with methanol, and is then mixed and boiled 3 times, each time with 3 liters of pure methanol so that after the final treatment the filtrate will be free of any chloride when tested with silver nitrate.

After drying in a vacuum drying oven at 50° C. the polymer in the form of a white powder is weighed. In order to determine the isotactic index, 10.00 g. is extracted as described in the foregoing examples. The results of these tests with gaseous monomers are summarized in Table 2.

TABLE 1

| Example No. | Aluminumalkyl (32 mmol) | Activator Name | Mmol | Polymer Product Yield | | Not soluble in ether, percent |
|---|---|---|---|---|---|---|
| | | | | Grams | Percent of theory | |
| 1 | Ethylaluminumdichloride | | | 3.4 | 4.1 | 0 |
| 2 | do | 2-methyloxazoline | 8 | 29.5 | 35.1 | 99.3 |
| 3 | do | do | 12 | 56.6 | 67.4 | 99.5 |
| 4 | do | do | 16 | 64.7 | 77.1 | 98.8 |
| 5 | do | do | 20 | 66.0 | 78.6 | 99.2 |
| 6 | do | do | 22 | 23.3 | 27.7 | 99.0 |
| 7 | do | do | 23 | | | 0 |
| 8 | Ethylaluminumsesquichloride | do | | 40.0 | 47.6 | 0 |
| 9 | do | do | 16 | 66.7 | 7.5 | 98.4 |
| 10 | do | do | 20 | 73.8 | 87.8 | 98.1 |
| 11 | do | do | 24 | 77.8 | 92.7 | 99.1 |
| 12 | do | do | 28 | 73.9 | 88.0 | 98.3 |
| 13 | do | do | 32 | 82.6 | 98.4 | 99.0 |
| 14 | do | do | 32.5 | 2.5 | 3.0 | 0 |
| 15 | do | do | 33 | | | 0 |
| 16 | do | 2-ethyloxazoline | 16 | 66.2 | 78.8 | 99.0 |
| 17 | do | do | 20 | 71.7 | 85.4 | 98.4 |
| 18 | do | do | 30 | 74.1 | 88.2 | 98.4 |
| 19 | do | do | 31 | 74.5 | 88.7 | 99.2 |
| 20 | do | do | 32 | | | 0 |
| 21 | do | 2-i-propyloxazoline | 16 | 75.4 | 89.7 | 99.2 |
| 22 | do | do | 20 | 72.5 | 86.3 | 98.1 |
| 23 | do | do | 24 | 71.0 | 84.5 | 99.3 |
| 24 | do | do | 30 | 79.6 | 94.8 | 98.8 |
| 25 | do | do | 32 | 80.2 | 95.5 | 99.1 |
| 26 | do | do | 36 | 77.4 | 92.1 | 97.0 |
| 27 | do | do | 37 | | | 0 |
| 28 | do | 2-phenyloxazoline | 12 | 54.3 | 64.7 | 98.5 |
| 29 | do | do | 16 | 58.9 | 70.2 | 97.4 |
| 30 | do | do | 24 | 61.0 | 72.6 | 99.0 |
| 31 | do | do | 28 | 64.2 | 76.5 | 98.6 |
| 32 | do | do | 32 | 69.4 | 82.6 | 97.5 |
| 33 | do | do | 33 | 22.6 | 26.9 | 99.1 |
| 34 | do | do | 34 | | | 0 |
| 35 | do | 2-n-heptyloxazoline | 24 | 80.2 | 95.5 | 94.8 |
| 36 | do | 2-phenyldihydrooxazine | 16 | 55.2 | 65.7 | 99.4 |
| 37 | do | do | 24 | 70.4 | 83.8 | 99.7 |
| 38 | do | 2,6-diphenyldihydrooxazine | 24 | 56.4 | 67.2 | 99.3 |
| 39 | do | 2-methyl-6-ethyldihydrooxazine | 16 | 71.7 | 85.3 | 99.3 |
| 40 | do | do | 24 | 77.7 | 92.5 | 98.6 |
| 41 | do | 2-vinyloxazoline | 16 | 61.7 | 73.5 | 99.8 |

0 indicates that value was not determined (insufficient substance).

with diethylether for eight hours in the Soxhlet-extractor, and the weight of the residue, insoluble in ether, as well as the weight of the extract are ascertained.

Table 1 shows some of the results of such tests.

EXAMPLES 42 to 54

Polymerization of propene or butene-(1)

For these tests a thermostatically heated autoclave with stirrer, made of glass with a capacity of 1 liter, which could withstand pressures up to 10 atmospheres at 95° C. was used. The catalyst suspension was prepared in the same manner as in Examples 1 to 41 and brought to a volume of 500 ml. Thereupon it is heated up to the reaction temperature and the monomer introduced. When, during the course of the polymerization, the quantity of monomer introduced had raised the total volume to approximately 800 ml. (8 hours), the supply was cut off and the stirring of the mixture continued overnight.

Then, not converted propene or butene was blown off and the mixture was decomposed and further processed Examples 1 to 41 show the basic effectiveness of the novel activators claimed, namely the great increase in yield in comparison with the not-activated catalyst systems (Examples 1 and 8) and the high content of components which are insoluble in ether.

If the 4-methylpentene-(1), used in the examples, is replaced by other α-olefine monomers such as styrene, allylbenzene, 3-methylbutene-(1) or dodecene-(1), the results so obtained will be comparable.

TABLE 2.—POLYMERIZATION OF PROPENE OR BUTENE-(1)

| Ex. No. | Monomer | Aluminumalkyl (mmol) | Activator (mmol) | Pressure (at.) | Temp. (° C.) | Polymer Product | |
|---|---|---|---|---|---|---|---|
| | | | | | | Grams | Not soluble in ether, percent |
| 42 | Propene | Ethylaluminumsesquichloride, 32 | Isopropyloxazoline | 10 | 60 | 41.0 | 80.3 |
| 43[1] | do | do | | 10 | 60 | 12.7 | 74.8 |
| 44[1] | do | Diethylaluminumchloride, 16 | | 10 | 60 | 36.3 | 76.6 |
| 45 | Butene-(1) | Ethylaluminumsesquichloride, 32 | Isopropyloxazoline, 24 | 1.5 | 60 | 180.9 | 90.0 |
| 46[1] | do | do | | 1.5 | 60 | 49.5 | 94.2 |
| 47[1] | do | Diethylaluminumchloride, 16 | | 1.5 | 60 | 125.1 | 93.8 |
| 48 | do | Ethylaluminumsesquichloride, 32 | Methyloxazoline, 16 | 1.5 | 40 | 140.6 | 96.7 |
| 49 | do | do | Methyloxazoline, 24 | 1.5 | 40 | 129.5 | 96.3 |
| 50[1] | do | do | | 1.5 | 40 | 35.4 | 95.5 |
| 51 | do | do | Methyloxazoline, 16 | 1.5 | 20 | 52.0 | 97.0 |
| 52 | do | do | Methyloxazoline, 24 | 1.5 | 20 | 93.2 | 97.8 |
| 53[1] | do | do | | 1.5 | 20 | 18.0 | 96.0 |
| 54[1] | do | Diethylaluminumchloride, 16 | | 1.5 | 20 | 42.7 | 96.9 |

[1] Examples 43, 44, 46, 47, 50, 53 and 54 are control tests.

Examples 45, when compared with Examples 46 and 47, demonstrates that at 60° C. and use of the claimed catalyst system 45 higher yields are attained than by use of the not activated system 46, the yield being also greater than in case of the rather effective system based on diethylaluminumchloride.

Examination of Examples 51 to 54 shows the even greater superiority of the claimed systems (51, 52) at a temperature of 20° C.

The invention is advantageous primarily in that the novel additives surpass in their activity even the hexamethyl phosphoric acid triamide, specified as particularly effective in the publication by COOVER and numerous patents. Furthermore, some of the compounds involved, especially the 2-alkyl-Δ²-oxazolines, can be prepared in a very simple and inexpensive manner, so that in comparison with the majority of known activators the novel additives have the further advantage of being economical, making it possible to utilize these substances industrially.

The novel three-components-catalysts, used in connection with the polymerization of propene and 4-methyl-pentene-(1) into isotactic polymers will lead to yields which are equivalent to the yields attainable by use of efficient binary Ziegler-Natta-catalysts, with the above described specific advantage that it is now possible to employ the halogen-rich aluminum compounds, which are inexpensive, easily accessible, and which are safe in handling.

A surprisingly advantageous effect can be observed in case of the polymerization of the butene-(1) if the polymerization temperature is lowered from 60° to 20° C. In this case the activity of the three-components-catalysts will decrease less rapidly than the activity of control catalysts consisting solely of diethylaluminumchloride and titaniumtrichloride, with the result that at 20° C. the three-components-catalyst will product a polymer up to 120% greater in quantity, but with the same amount of costly titaniumtrichloride as required by the other type of catalyst. Engineering-wise it is especially desirable to carry out the butene-polymerization at such low temperatures because the polymer so obtained will be less expanded or dissolved by the diluent, and because the viscosity of the mixture will increase to a lesser degree during the course of the polymerization. This will influence advantageously problems of thorough mixing and dissipation of heat arising during polymerization as well as in connection with further processing. It is then also feasible to prepare a reaction mixture for a higher content of polymer, resulting in lesser costs for diluents.

We claim:

1. Process for the low-pressure polymerization of a polymerizable monomer selected from the group consisting of styrene, vinyl cyclohexane and olefines of the formula

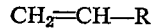

in which R stands for a member of the group consisting of aliphatic hydrocarbon radicals containing up to 8 carbon atoms, which comprises carrying out the polymerization at a pressure of 0 to 10 atmospheres gauge pressure and at a temperature within the range from $-10$ to $+80°$ C. in the presence of a catalytic amount of a mixed catalyst consisting essentially of the mixture and reaction products of (1) a member selected from the group consisting of methyl- and ethylaluminum-sesqui- and dichlorides (2) titanium trichloride and (3) a cyclic imidoester of the formula

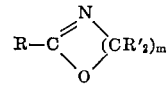

which R and R' each stands for a member selected from the group consisting of hydrogen, alkyl radicals containing up to 20 carbon atoms, cycloalkyl radicals containing up to 8 carbon atoms and aryl radicals and in which $m$ is an integer selected from the group consisting of 2 and 3, the ratio of aluminum to titanium being maintained within the limits 6:1 and 1:1.

2. The process defined in claim 1, in which the molar ratio of the cyclic imidoester to the aluminum compound of the catalyst mixture is between 0.25 and 1 and 1 to 1.

References Cited

UNITED STATES PATENTS 3,177,189  4/1965  Fuhrmann et al.
3,178,401  4/1965  Coover et al.

FOREIGN PATENTS 1,301,596  7/1962  France.

JAMES A. SEIDLECK, Primary Examiner

U.S. Cl. X.R.
260—88.2, 93.5, 93.7